US012752849B2

(12) United States Patent
Sherwood et al.

(10) Patent No.: US 12,752,849 B2
(45) Date of Patent: Oct. 6, 2026

(54) VEHICLE FRAME AND CORRESPONDING JOINT STRUCTURE

(71) Applicant: FORD GLOBAL TECHNOLOGIES, LLC, Dearborn, MI (US)

(72) Inventors: William Moore Sherwood, Beverly Hills, MI (US); Greg Gombert, Canton, MI (US); Sukhwinder Singh Dhindsa, Windsor (CA); Venkateswaran Ramanarayanan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 18/815,335

(22) Filed: Aug. 26, 2024

(65) Prior Publication Data

US 2026/0054775 A1 Feb. 26, 2026

(51) Int. Cl.
*B62D 21/02* (2006.01)
*B60K 1/04* (2019.01)
*B62D 27/02* (2006.01)

(52) U.S. Cl.
CPC ................ *B62D 21/02* (2013.01); *B60K 1/04* (2013.01)

(58) Field of Classification Search
None
See application file for complete search history.

(56) References Cited

U.S. PATENT DOCUMENTS 4,989,365 A * 2/1991 Roger .................. A01G 17/085 47/1.01 R
8,567,821 B1 10/2013 Wagner et al.
8,915,530 B2 12/2014 Wagner et al.
9,776,662 B2 10/2017 Hirano et al.
2015/0158441 A1* 6/2015 Nusier .................... B60R 19/34 293/133

FOREIGN PATENT DOCUMENTS

CN 101508312 B * 10/2011 ............. B62D 21/02
DE 102022127009 A1 * 10/2023 ......... B62D 25/2036
DE 102025124017 A1 * 12/2025 ............. B62D 21/03
WO WO-02070322 A1 * 9/2002 ........... B62D 23/005

* cited by examiner

*Primary Examiner* — Hung Q Dang
(74) *Attorney, Agent, or Firm* — Todd Dishman; Brooks Kushman P.C.

(57) ABSTRACT

A joint structure for a vehicle frame includes a first structural tube, a second structural tube, and a pin. The first structural tube has first and second panels opposing each other. The first structural tube has third and fourth panels opposing each other. The second structural tube extends through the first panel and the second panel. The second structural tube has fifth and six panels opposing each other. The pin is secured to the first structural tube. The pin extends through the third panel, to the fifth panel, through the fifth panel, to the sixth panel, through the sixth panel, to the fourth panel, and through the fourth panel such that the first structural tube, second structural tube, and pin are collectively operable to resist shear and bending forces between the first structural tube and the second structural tube.

20 Claims, 5 Drawing Sheets

VEHICLE FRAME AND CORRESPONDING JOINT STRUCTURE

TECHNICAL FIELD

The present disclosure relates to vehicle body structures and/or vehicle frame structures.

BACKGROUND

Vehicles and automobiles include bodies and/or frames that operate as the underlying support structure for the other subsystems of the vehicle (e.g., powertrain systems, steering systems, etc.).

SUMMARY

A vehicle frame includes a front rail, a front deflector, and a pin. The front rail has a first side, a second side, a third side, and a fourth side. The front rail defines a first internal cavity between the first, second, third, and fourth sides. The first and second sides are opposite to each other. The third and fourth sides are opposite to each other. The third and fourth sides are transverse to the first and second sides. The front deflector extends transversely outward from the front rail. The front deflector extends through the first side, the first internal cavity, and the second side. The front deflector includes a fifth side and a sixth side that are opposite to each other. The front deflector defines a second internal cavity between the fifth and the sixth sides. The fifth and sixth sides are transverse to the first and second sides. The pin is secured to the front rail. The pin extends through the third side, the first internal cavity, the fifth side, the second internal cavity, the sixth side, and the fourth side such that the front rail, front deflector, and pin form a joint that is operable to resist shear and bending forces between the front rail and front deflector.

A joint structure for a vehicle frame includes a first structural tube, a second structural tube, and a pin. The first structural tube has first and second panels opposing each other. The first structural tube has third and fourth panels opposing each other. The second structural tube extends through the first panel and the second panel. The second structural tube has fifth and six panels opposing each other. The pin is secured to the first structural tube. The pin extends through the third panel, to the fifth panel, through the fifth panel, to the sixth panel, through the sixth panel, to the fourth panel, and through the fourth panel such that the first structural tube, second structural tube, and pin are collectively operable to resist shear and bending forces between the first structural tube and the second structural tube.

A vehicle includes a traction battery and a frame. The traction battery is configured to store and provide electrical power to propel the vehicle. The frame is operable to support the traction battery. A front end of the frame includes a first structural tube, a second structural tube, and a pin. The first structural tube extends between forward and rearward regions of the vehicle. The first structural tube has a first top side, a first bottom side, a first lateral side, and a second lateral side. The first structural tube defines a first internal cavity between the first top side, the first bottom side, the first lateral side, and the second lateral side. The second structural tube is secured to the first structural tube. The second structural tube extends through the first lateral side, the first internal cavity, and the second lateral side. The second structural tube has a second top side and a second bottom side. The second structural tube defines a second internal cavity between the second top side and the second bottom side. The pin is secured to the first structural tube. The pin extends through the first top side, the first internal cavity, the second top side, the second internal cavity, the second bottom side, and the first bottom side such that the first structural tube, second structure tube, and pin form a joint that is operable to resist shear and bending forces between the first structural tube and the second structural tube.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
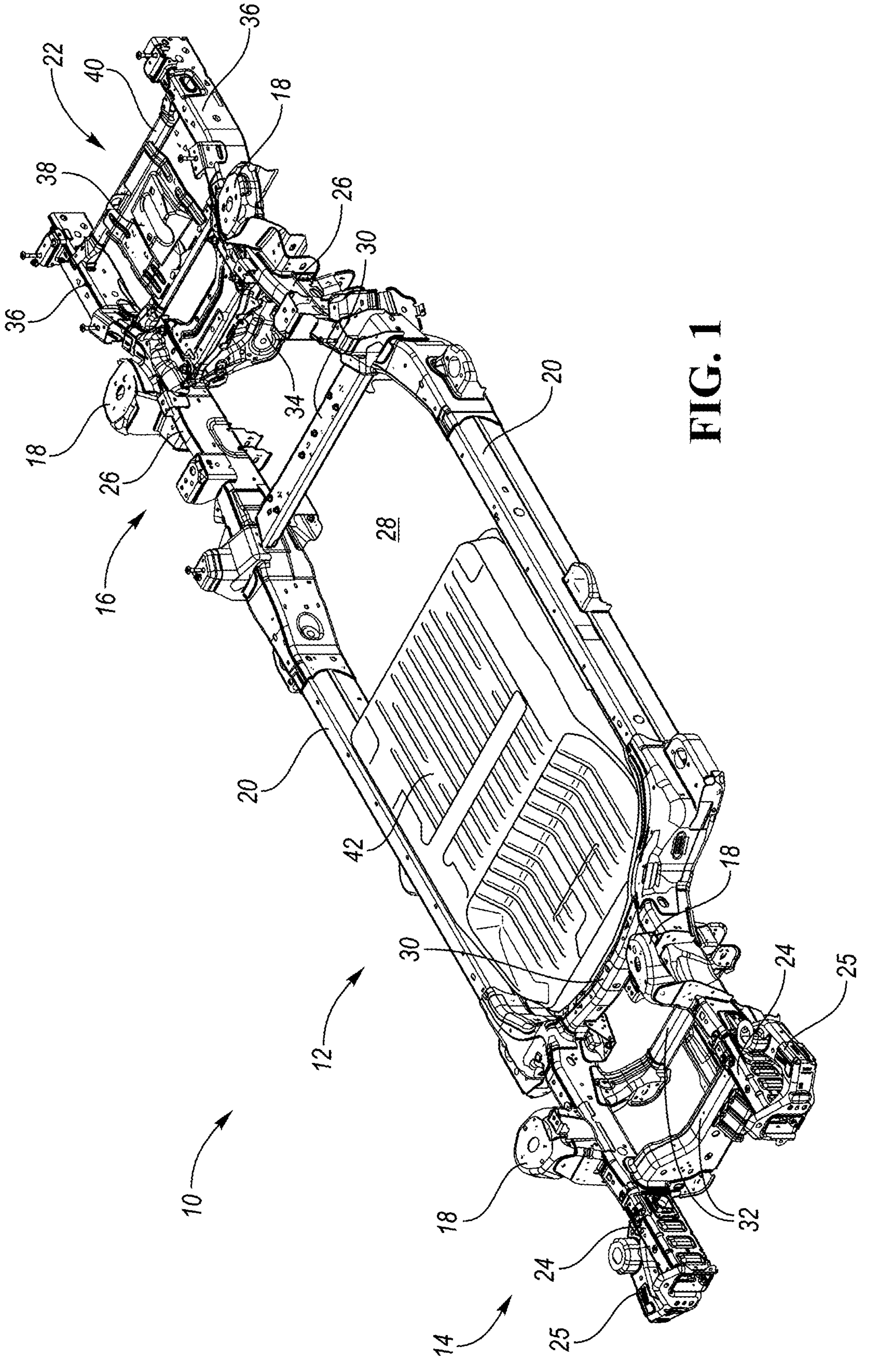
FIG. 1 is a perspective top view of a lower portion or lower structure of a vehicle frame that includes the front frame structure and the rear underbody structure.

Referring to FIG. 1, a vehicle 10 having a vehicle frame 12 is illustrated. More specifically, the frame 12 may be a lower portion or lower structure of the vehicle frame 12. The frame 12 that includes a front end or a front frame structure 14 and a rear underbody structure 16 along with additional vehicle frame subcomponents that form the vehicle frame 12, or more specifically that form the lower portion of the vehicle frame 12. The additional vehicle frame subcomponents may include shock or strut towers 18, first and second rocker rails or side rails 20, and a trunk support structure 22. The shock or strut towers 18 may include pairs of shock or strut towers 18 disposed along wheel wells of the frame 12. The first and second side rails 20 may also be referred to as a pair of rocker rails or side rails 20. A first pair of the shock or strut towers 18 may be secured to the front frame structure 14 while a second pair of the shock or strut towers 18 may be secured to the rear underbody structure 16. The first and second side rails 20 extend between a forward region of the vehicle 10 or frame 12 (e.g., a region where the front frame structure 14 is positioned) and a rearward region of the vehicle 10 or frame 12 (e.g., a region where the rear underbody structure 16 is positioned).

The front frame structure 14 may be secured to the additional vehicle frame subcomponents, or more specifically to the first and second rocker rails or side rails 20, along front ends of the first and second rocker rails or side rails 20. More specifically, rear outward ends of first and second front rails 24 of the front frame structure 14 may be secured to the front ends of the first and second rocker rails or side rails 20. The first and second front rails 24 may also be referred to as the front horns. The first and second front rails 24 extend in a direction between the forward region of the vehicle 10 or frame 12 (e.g., a region where the front frame structure 14 is positioned) and the rearward region of the vehicle 10 or frame 12 (e.g., a region where the rear underbody structure 16 is positioned).

First and second front deflectors 25 may be secured to the first and second front rails 24. The first and second front deflectors 25 may be referred to as sparrow members and may be operable absorb energy. The rear underbody structure 16 may be secured to the additional vehicle frame subcomponents, or more specifically to the first and second rocker rails or side rails 20, along rear ends of the first and second rocker rails or side rails 20. More specifically, front ends of first and second opposing rear side members 26 may be secured to the rear ends of the first and second rocker rails or side rails 20.

A cabin space 28 may be defined between the front frame structure 14, rear underbody structure 16, and the first and second rocker rails or side rails 20. Crossmembers 30 may extend between the front ends and rear ends of the first and second rocker rails or side rails 20. At least one crossmember 32 may extend between the first and second front rails 24. At least one crossmember 34 may extend between the rear side members 26.

The trunk support structure 22 includes first and second rearward side rails 36, a trunk floor support 38, and a rear support member or bumper support 40. The first and second rearward side rails 36 may also be referred to as a pair of rearward side rails 36. Front ends of the first and second rearward side rails 36 may be secured to rear ends of the first and second opposing rear side members 26, respectively. The bumper support 40 may extend between and may be secured to reward regions of the first and second rearward side rails 36. The trunk floor support 38 may be disposed between the first and second rearward side rails 36. The trunk floor support 38 may extend between a rearward crossmember of the at least one crossmember 34 and the bumper support 40. The trunk floor support 38 may be secured to each of the rearward crossmember of the at least one crossmember 34 and the bumper support 40.

The vehicle 10 may include a traction battery 42 that is configured to store and provide electrical power to propel the vehicle 10. The frame 12 may be operable to support the traction battery 42. The traction battery 42 may be disposed between and secured to each of the first and second rocker rails or side rails 20. It is noted, however, the frame may be operable to support other powertrain elements in addition to or in lieu of a traction battery 42. For example, in some configurations the vehicle 10 may not include a traction battery or an electric motor that this powered by the battery to propel the vehicle but may include an internal combustion to propel the vehicle 10. In other configurations, the vehicle 10 may not include an internal combustion engine but may only include a traction battery and corresponding electric motor to propel the vehicle 10. In yet some other configurations, the vehicle may include a traction battery, electric motor, and an internal combustion engine.

The subcomponents of the vehicle frame 12 may be secured to each other via fasteners (e.g., screws, rivets, bolts, etc.), adhesives, welding, press-fitting, or any other method known in the art. The subcomponents of the vehicle frame 12 may be made from steel, aluminum, magnesium, titanium, or any other material that may operate as a support structure for the other components and subsystems of a vehicle.

Referring to FIGS. 2-7, a portion of the front frame structure 14 is illustrated. The elements of the portion of the front frame structure illustrated in FIGS. 2-7 form a structural joint 44. More specifically, the structural joint 44 includes one of the front rails 24 and one of the front deflectors 25. The front rails 24 and front deflectors 25 may be structural tubes. The front rail 24 and front deflector 25 illustrated in FIGS. 2-7 may be referred to as first and second structural tubes, respectively, or vice versa. The cross-sections of each of the first and second structural tubes comprising the front rail 24 and front deflector 25 may be rectangular in shape.

The front rail 24 has a first panel or side 46, a second panel or side 48, a third panel or side 50, and a fourth panel or side 52. The first side 46 and second side 48 oppose each (e.g., are positioned on opposite sides of the front rail 24). The third side 50 and fourth side 52 oppose each (e.g., are positioned on opposite sides of the front rail 24). The first side 46 and second side 48 are transverse to the third side 50 and fourth side 52 (e.g., the first side 46 and second side 48 each extend between the third side 50 and fourth side 52, the third side 50 and fourth side 52 each extend between the first side 46 and second side 48, the first side 46 and second side 48 are each orthogonal to third side 50 and fourth side 52, etc.). The first side 46, second side 48, third side 50, and fourth side 52 define an internal cavity 54 therebetween.

The first side 46 may be a first lateral panel or first lateral side of the front rail 24. The second side 48 may be a second lateral panel or second lateral side of the front rail 24. The third side 50 may be a top panel or top side of the front rail 24. The fourth side 52 may be a bottom panel or bottom side of the front rail 24. The front rail 24 may be formed from two panels 56 having C-shaped cross-sections. The C-shaped cross-sections and may be secured to each other along overlapping regions of the C-shaped cross-sections. The panels 56 may be secured to reach other via any method know it the art. For example, the panels 56 may be secured to each other via an adhesive, welds, fasteners (e.g., rivets, bolts, screws, clips, snaps), etc.

The front deflector 25 extend transversely outward from the front rail 24 along the vehicle 10 or along the frame 12 (e.g., the front deflector 25 extends outward from the front rail 24 in a direction that is orthogonal to a direction extending between the forward and rearward regions of the vehicle 10 or frame 12). The front deflector 25 also extends through the first side 46 of the front rail 24, the internal cavity 54 defined by the elements of the front rail 24, and second side 48 of the front rail 24.

The front deflector 25 has a first panel or side 58, a second panel or side 60, a third panel or side 62, and a fourth panel or side 64. In order distinguish from the panels or sides of the front rail 24, the first panel or side 58 may be referred to as the fifth panel or side, the second panel or side 60 may be referred to as the sixth panel or side, the third panel or side 62 may be referred to as the seventh panel or side, and the fourth panel or side 64 may be referred to as the eighth panel or side.

The first side 58 and second side 60 oppose each (e.g., are positioned on opposite sides of the front deflector 25). The third side 62 and fourth side 64 oppose each (e.g., are positioned on opposite sides of the front deflector 25). The first side 58 and second side 60 are transverse to the third side 62 and fourth side 64 (e.g., the first side 58 and second side 60 each extend between the third side 62 and fourth side 64, the third side 62 and fourth side 64 each extend between the first side 58 and second side 60, the first side 58 and second side 60 are each orthogonal to third side 62 and fourth side 64, etc.). The first side 58, second side 60, third side 62, and fourth side 64 define an internal cavity 66 therebetween.

The first side 58 may be a top panel or top side of the front deflector 25. The second side 60 may be a bottom panel or bottom side of the front deflector 25. Therefore, the first side 58 and second side 60 of the front deflector 25 may be transverse (e.g., orthogonal) to the first side 46 and the second side 48 of the front rail. The third side 62 may be a first lateral panel or first lateral side of the front deflector 25. The fourth side 64 may be a second lateral panel or second lateral side of the front deflector 25. Therefore, the third side 62 and the fourth side 64 of the front deflector 25 may be transverse (e.g., orthogonal) to the third side 50 and the fourth side 52 of the front rail 24.

The front deflector 25 may be formed from two panels 68 having C-shaped cross-sections and may be secured to each other along overlapping regions of the C-shaped cross-sections. The panels 68 may be secured to reach other via any method know it the art. For example, the panels 68 may be secured to each other via an adhesive, welds, fasteners (e.g., rivets, bolts, screws, clips, snaps), etc.

A pin 70 is secured to the front rail 24. The pin 70 may comprise a solid or hollow element such as a shaft or tube, respectively. The pin 70 extends through the third side 50 of the front rail 24, through a first portion of the internal cavity 54 defined by the elements of the front rail 24, to the first side 58 of the front deflector 25, through the first side 58 of the front deflector 25, through the internal cavity 66 defined by the elements of the front deflector 25, to the second side 60 of the front deflector, through the second side 60 of the front deflector, through a second portion of the internal cavity 54 defined by the elements of the front rail 24, to the fourth side 52 of the front rail 24, and through the fourth side 52 of the front rail 24 such that such that the front rail 24, the front deflector 25, and the pin 70 form the structural joint 44, which is operable to resist shear and bending forces between the front rail 24 and front deflector 25. Stated in other terms, the front rail 24, front deflector 25, and pin 70 are collectively operable to resist shear and bending forces between the front rail 24 and front deflector 25.

A cross-section 72 of the front deflector 25 along a portion or region 74 of the front deflector 25 that is disposed within the internal cavity 54 defined by the elements of the front rail 24 tapers in a direction 76 extending from the first side 46 and toward the second side 48 of the front rail 24 (e.g., in a direction laterally across the front rail 24). The first side 46 and second side 48 of the front rail 24 define aligned openings 78. The front deflector 25 extends through the aligned openings 78. The aligned openings 78 are differently sized to account for the taper in the cross-section 72 of the front deflector 25 along the portion or region 74 of the front deflector 25 that is disposed within the internal cavity 54.

Figure 2:
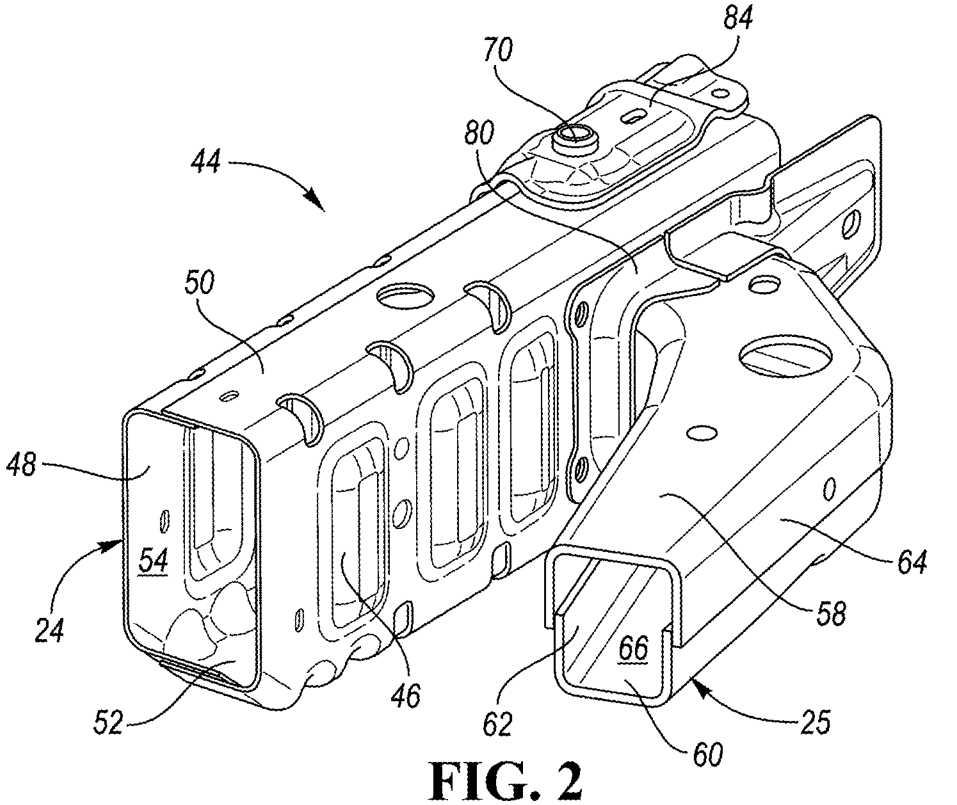
FIG. 2 is a right-side perspective front view of a portion of the front frame structure where the elements of the portion of the front frame structure form a structural joint.
Figure 3:
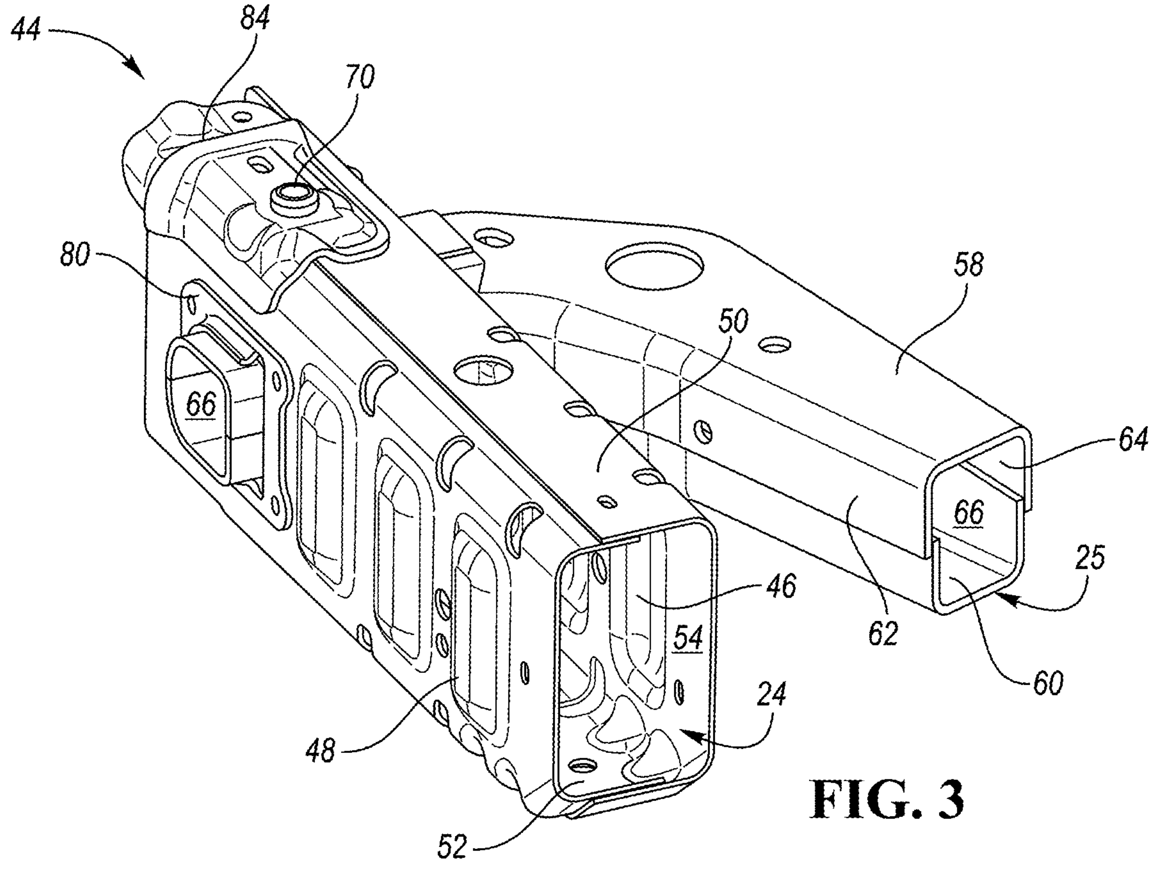
FIG. 3 is a left-side perspective front view of the portion of the front frame structure including the elements that form the structural joint.
Figure 4:
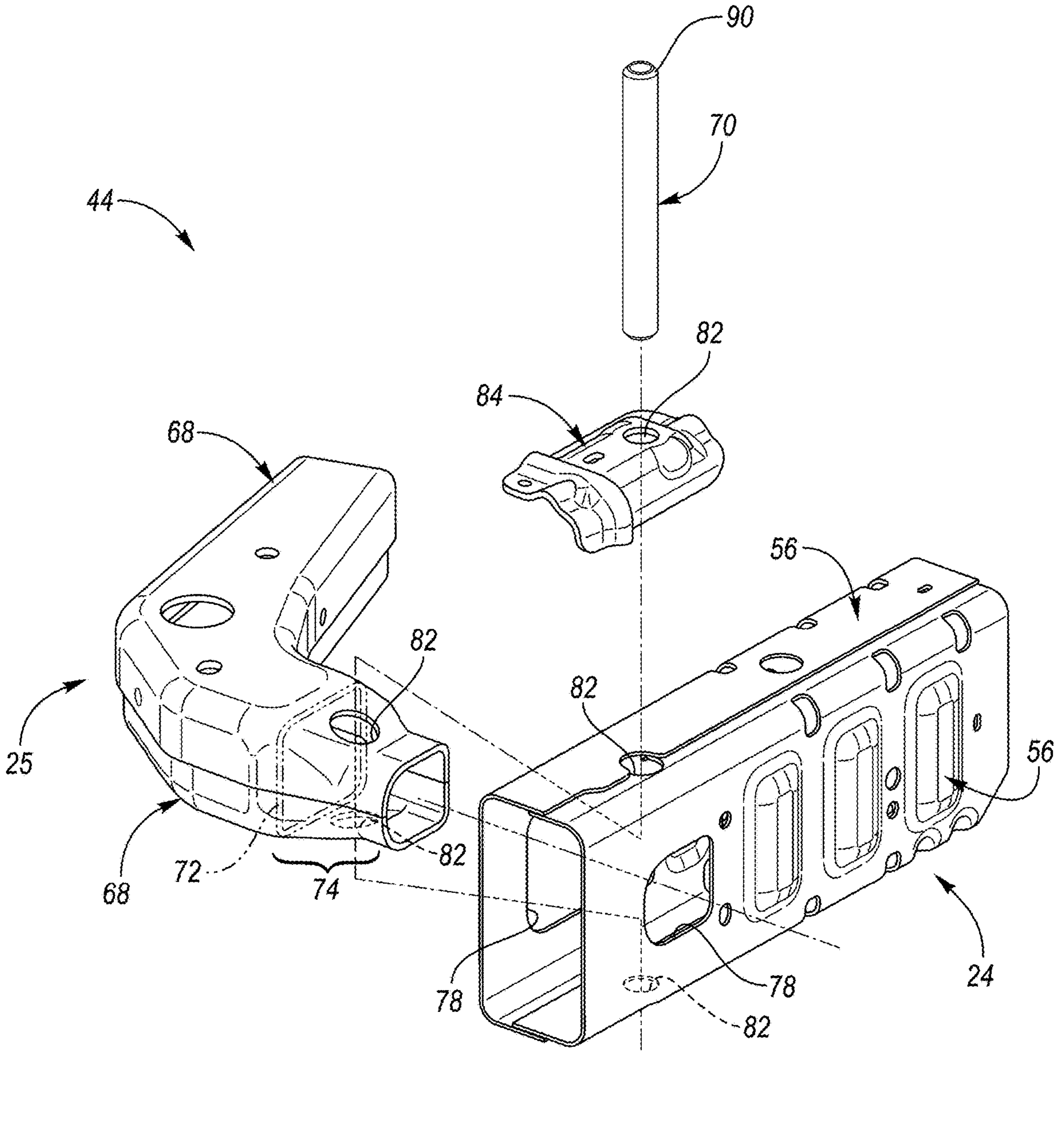
FIG. 4 is an exploded perspective rear view of the portion of the front frame structure including the elements that form the structural joint.
Figure 5:
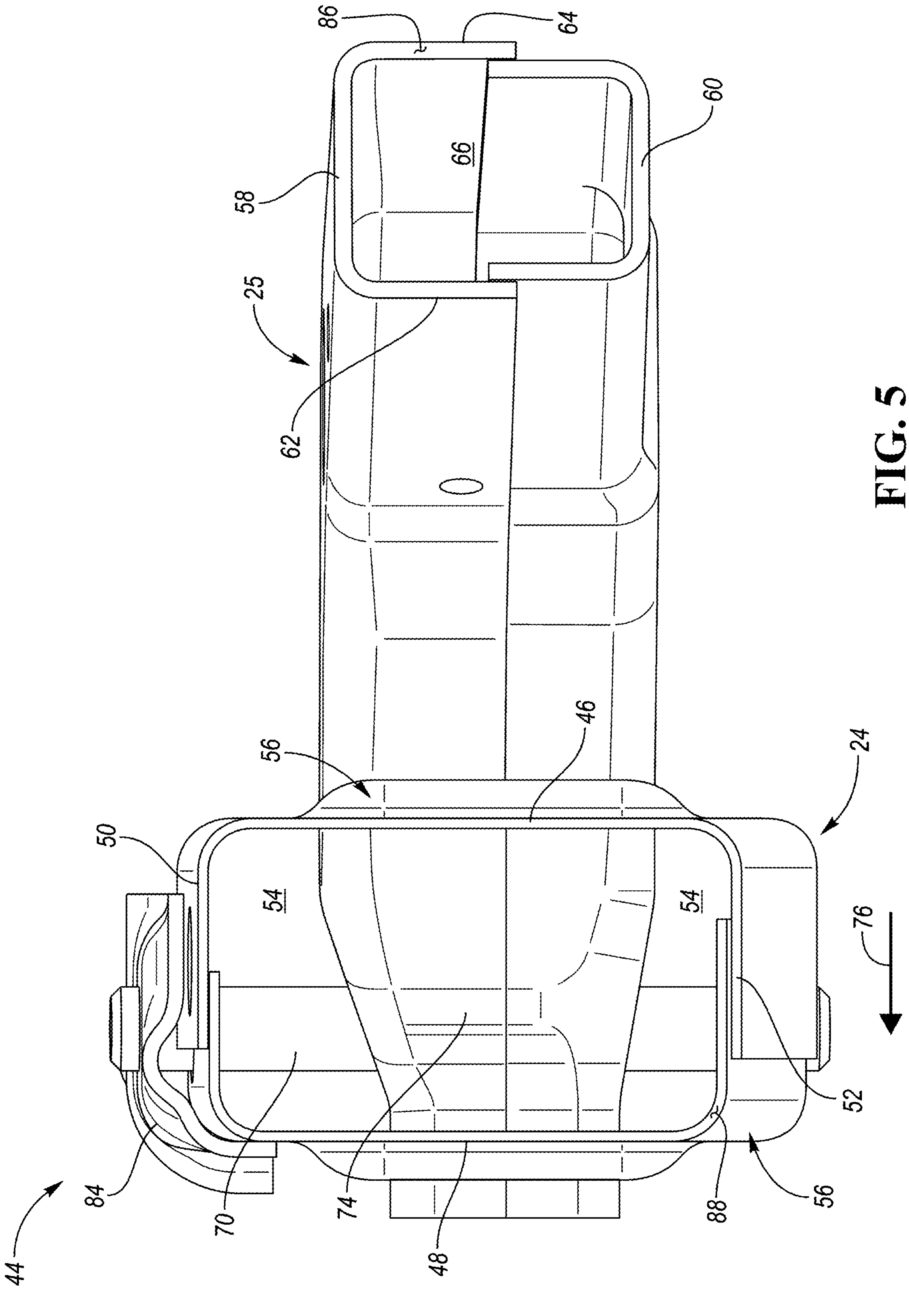
FIG. 5 is a front view of the portion of the front frame structure including the elements that form the structural joint.
Figure 6:
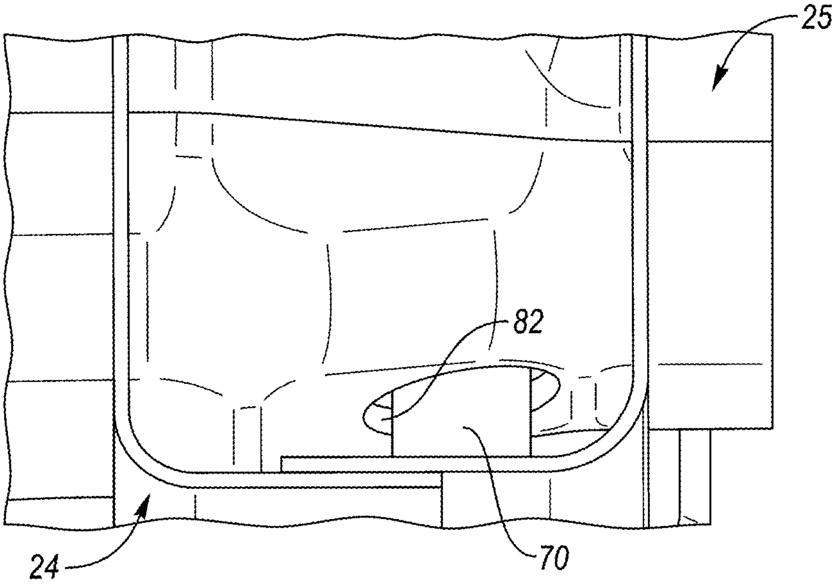
FIG. 6 is a magnified perspective bottom front view of the front frame structure including the elements that form the structural joint and illustrating an intersection between a structural tube and a pin.
Figure 7:
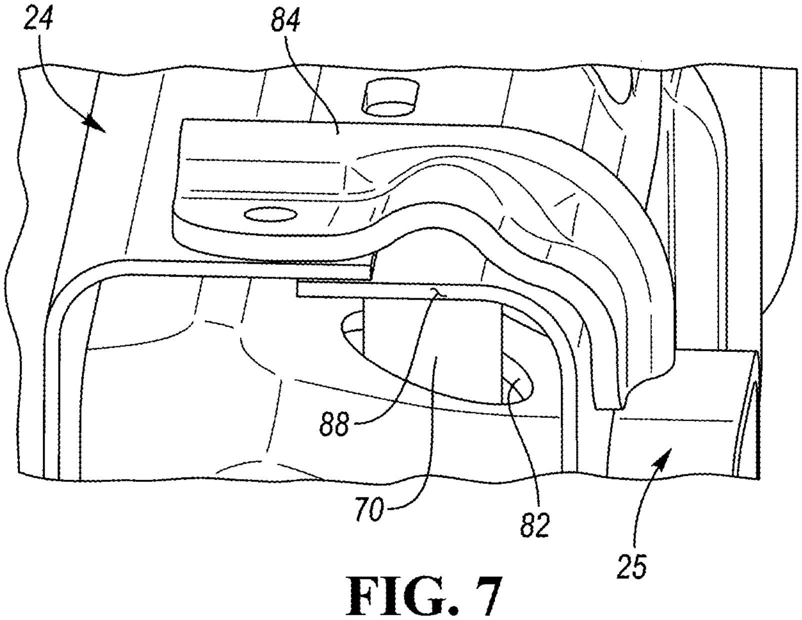
FIG. 7 is a magnified perspective top front view of the front frame structure including the elements that form the structural joint and illustrating the intersection between the structural tube and the pin.

The front deflector 25 may secured to the front rail 24 via any method know in the art. For example, the front deflector 25 may be attached to the front rail 24 via an adhesive within or along the aligned openings 78, the front deflector 25 may be press-fit into the aligned openings 78, the front deflector 25 may be welded to the front rail 24 along the aligned openings 78, etc. More specifically, the front deflector 25 and the front rail 24 may each be welded to bridging plates 80 that are disposed along the exterior of the front rail 24 and around outer peripheries of the aligned openings 78. The bridging plates 80 are illustrated in FIGS. 2 and 3 but have been excluded from FIG. 4-7 for ease of illustration.

The third side 50 of the front rail 24, the fourth side 52 of the front rail 24, the first side 58 of the front deflector 25, and the second side 60 of the front deflector 25 may define aligned orifices 82. The pin 70 extends through each orifice of the aligned orifices 82. The aligned orifices 82 defined by the first side 58 of the front deflector 25 and the second side 60 of the front deflector 25 provide clearance for the pin 70 such that the pin 70 does not contact the front deflector 25 within the aligned orifices 82 defined by the first side 58 and second side 60 of the front deflector 25. In an alternative configuration, the pin 70 may be attached to the front deflector 25 via an adhesive, weld, press-fit, etc. along the aligned orifices 82 defined by the first side 58 of the front deflector 25 and the second side 60 of the front deflector 25. The pin 70 may be connected to the front rail 24 within the aligned orifices 82 defined by the third side 50 of the front rail 24 and the fourth side 52 of the front rail 24.

The pin 70 may be attached to the front rail 24 via any method know in the art. For example, the pin 70 may attached to the front rail 24 via an adhesive within or along the aligned orifices 82 defined by the front rail 24, the pin 70 may be press-fit into the aligned orifices 82 defined by the front rail 24, the pin 70 may be welded to the front rail along the aligned orifices 82, etc. Furthermore, or in addition to the attachment methods described herein, the pin 70 and the front rail 24 may each be welded to a reinforcement or support plate 84. Such a reinforcement or support plate 84 may be disposed on the third side 50 of the front rail 24 and around an outer periphery of the of the aligned orifice 82 defined by the third side 50 of the front rail 24. The support plate 84 may define an addition orifice of the aligned orifices 82 that is further operable to receive the pin 70.

The first side 46, second side 48, third side 50, and fourth side 52 of the front rail 24 form a first outer wall 86. The first side 58, second side 60, third side 62, and fourth side 64 of the front deflector 25 form a second outer wall 88. The pin may form a third outer wall 90 in the event the pin 70 is in the form of a hollow tube as opposed to a solid shaft. A ratio of the thickness of the third outer wall 90 of the pin 70 relative to the thickness of the first outer wall 86 of the front rail 24 may range between 1.25 and 1.75. A ratio of the thickness of the third outer wall 90 of the pin 70 relative to the thickness of the second outer wall 88 of the front deflector 25 may range between 0.6 and 0.95. A ratio of the thickness of the second outer wall 88 of the front deflector 25 relative to the first outer wall 86 of the front rail 24 may range between 1.5 and 2.0.

The vehicle 10 or frame 12 may include two structural joints 44, including a front rail 24, a front deflector 25, and a pin 70, on opposing lateral sides of the vehicle 10 or frame 12. The two joints 44 may be mirror images of each other. The positioning of the pins 70 within the joints 44 operates to resist shear and bending forces that may exist between the front rail 24 and front deflector 25.

The front rail 24, front deflector 25, pin 70, bridging plates 80, support plate 84, and any other element of the frame 12 may be made from any desirable structural material such as a metal or composite material. For example, the front rail 24, front deflector 25, pin 70, bridging plates 80, support plate 84, and other elements of the frame 12 may be made from steel, aluminum, magnesium, titanium, etc. As another example, the front rail 24, front deflector 25, pin 70, bridging plates 80, support plate 84, and other elements of the frame 12 may be made from fiber-reinforced plastics. Fiber-reinforced plastics (also known as fiber-reinforced polymers) are composite materials made of a polymer matrix reinforced with fibers. The fibers may be glass, carbon, basalt, aramid or other appropriate reinforcing materials. The polymer may be an epoxy, vinylester, polyester thermosetting plastic, phenol formaldehyde resin, or other appropriate polymer or plastic. Fiber-reinforced plastics may also be heat and/or pressure cured.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle frame comprising:

a front rail having a first side, a second side, a third side, and a fourth side, and defining a first internal cavity between the first, second, third, and fourth sides, wherein (i) the first and second sides are opposite to each other, (ii) the third and fourth sides are opposite to each other, and (iii) the third and fourth sides are transverse to the first and second sides;

a front deflector extending transversely outward from the front rail, wherein the front deflector (i) extends through the first side, the first internal cavity, and the second side, (ii) includes a fifth side and a sixth side that are opposite to each other, and (iii) defines a second internal cavity between the fifth and the sixth sides, and wherein the fifth and sixth sides are transverse to the first and second sides; and a pin (i) secured to the front rail and (ii) extending through the third side, the first internal cavity, the fifth side, the second internal cavity, the sixth side, and the fourth side such that the front rail, front deflector, and pin form a joint that is operable to resist shear and bending forces between the front rail and front deflector.

2. The vehicle frame of claim 1, wherein a cross-section along a portion of the front deflector that is disposed within the first internal cavity tapers in a direction extending from the first side and toward the second side of the front rail.

3. The vehicle frame of claim 2, wherein the first and second sides of the front rail define aligned openings, the front deflector extends through the aligned openings, and the aligned openings are differently sized to account for the taper in the cross-section along the portion of the front deflector.

4. The vehicle frame of claim 1, wherein the third side of the front rail, the fourth side of the front rail, the fifth side of the front deflector, and the sixth side of the front deflector define aligned orifices, and wherein the pin extends through each orifice of the aligned orifices.

5. The vehicle frame of claim 4, wherein the aligned orifices defined by the fifth side of the front deflector and the sixth side of the front deflector provide clearance for the pin such that the pin does not contact the front deflector within the aligned orifices.

6. The vehicle frame of claim 1 further comprising a support plate disposed on the third side of the front rail, wherein the pin is secured to the support plate.

7. A joint structure for a vehicle frame comprising:

a first structural tube having first and second panels opposing each other, and having third and fourth panels opposing each other;

a second structural tube extending through the first panel and the second panel, wherein the second structural tube has fifth and sixth panels opposing each other; and a pin secured to the first structural tube, wherein the pin extends through the third panel, to the fifth panel, through the fifth panel, to the sixth panel, through the sixth panel, to the fourth panel, and through the fourth panel such that the first structural tube, second structural tube, and pin are collectively operable to resist shear and bending forces between the first structural tube and the second structural tube.

8. The joint structure of claim 7, wherein a cross-section along a portion of the second structural tube tapers in a direction extending from the first panel and toward the second panel of the first structural tube.

9. The joint structure of claim 8, wherein the first and second panels of the first structural tube define aligned openings, the second structural tube extends through the aligned openings, and the aligned openings are differently sized to account for the taper in the cross-section along the portion of the second structural tube.

10. The joint structure of claim 7, wherein the third panel of the first structural tube, the fourth panel of the first structural tube, the fifth panel of the second structural tube, and the sixth panel of the second structural tube define aligned orifices, and wherein the pin extends through each orifice of the aligned orifices.

11. The joint structure of claim 10, wherein the aligned orifices defined by the fifth panel of the second structural tube and the sixth panel of the second structural tube provide clearance for the pin such that the pin does not contact the second structural tube within the aligned orifices.

12. The joint structure of claim 7 further comprising a support plate disposed on the third panel of the first structural tube, wherein the pin is secured to the support plate.

13. The joint structure of claim 7, wherein the first structural tube is a front rail.

14. The joint structure of claim 7, wherein the second structural tube is a front deflector.

15. A vehicle comprising:

a traction battery configured to store and provide electrical power to propel the vehicle; and a frame operable to support the traction battery, wherein a front end of the frame includes, a first structural tube extending between forward and rearward regions of the vehicle, wherein the first structural tube has a first top side, a first bottom side, a first lateral side, and a second lateral side, and defines a first internal cavity between the first top side, the first bottom side, the first lateral side, and the second lateral side, a second structural tube secured to the first structural tube, wherein the second structural tube extends through the first lateral side, the first internal cavity, and the second lateral side, and wherein the second structural tube has a second top side and a second bottom side, and defines a second internal cavity between the second top side and the second bottom side, and a pin secured to the first structural tube, wherein the pin extends through the first top side, the first internal cavity, the second top side, the second internal cavity, the second bottom side, and the first bottom side such that the first structural tube, second structural tube, and pin form a joint that is operable to resist shear and bending forces between the first structural tube and the second structural tube.

16. The vehicle of claim 15, wherein a cross-section along a portion of the second structural tube tapers in a direction extending from the first lateral side and toward the second lateral side of the first structural tube.

17. The vehicle of claim 16, wherein the first and second lateral sides of the first structural tube define aligned openings, the second structural tube extends through the aligned openings, and the aligned openings are differently sized to account for the taper in the cross-section along the portion of the second structural tube.

18. The vehicle of claim 15, wherein the first top side of the first structural tube, the first bottom side of the first structural tube, the second top side of the second structural tube, and the second bottom side of the second structural tube define aligned orifices, and wherein the pin extends through each orifice of the aligned orifices.

19. The vehicle of claim 18, wherein the aligned orifices defined by the second top side of the second structural tube and the second bottom side of the second structural tube provide clearance for the pin such that the pin does not contact the second structural tube within the aligned orifices.

20. The vehicle of claim 15, wherein the first structural tube is a front rail, and the second structural tube is a front deflector.

* * * * *